Oct. 19, 1965   D. L. CURTIS   3,212,286
SPACE ENCLOSURE COOLING ARRANGEMENT
Filed July 13, 1964

INVENTOR.
DANIEL L. CURTIS
BY John L. Stewart
ATTORNEY

United States Patent Office 3,212,286
Patented Oct. 19, 1965

3,212,286
SPACE ENCLOSURE COOLING ARRANGEMENT
Daniel L. Curtis, Manhattan Beach, Calif., assignor to Litton Systems, Inc., Beverly Hills, Calif.
Filed July 13, 1964, Ser. No. 382,060
9 Claims. (Cl. 62—259)

This invention relates to provisions for supporting life in space and in particular to arrangements for cooling space enclosures.

A man in space is to be protected from the hostile environment by an enclosure such as a space suit. The space suit must provide for the controlled dissipation of the excess body heat of the man as well as heat due to external radiation, as from the sun. Previous solutions to this cooling problem have involved excessively heavy and cumbersome equipment, generally including a cooling garment and a coolant system having pumps, valves and a coolant reservoir. Another shortcoming of known approaches is that although they use evaporation into space as the principal cooling mechanism, the manner in which this is done tends to be inefficient, requiring complex regulation with valves and similar apparatus. Water, with its high latent heat of evaporation, is a favored evaporant, but evaporators using it are likely to be rendered inoperative by freezing.

A principal object of this invention is to cool a space enclosure such as a space suit in an improved manner. Another object is to dissipate a liquid into space efficiently, using a minimum of equipment.

In accordance with one exemplary embodiment of the invention, a space suit having a thermally conductive wall is provided with a plurality of porous metal block evaporators distributed over and in good thermal contact with the exterior of the wall. Heat transfer from the inhabitant of the suit to the wall is effected principally by radiation. The metal blocks act as constant temperature heat sinks dissipating into space the heat transferred to them by the suit wall. The evaporators are supplied water evaporant from a reservoir within the space suit, the water being under the atmospheric pressure of the suit. On first entering the evaporator, the water does not immediately freeze, due to its own vapor pressure, and wetting of the interior surfaces of the evaporator block occurs. The water freezes and then sublimes to remove heat from the block. As sublimation proceeds, passages open to admit more water, thus sustaining the cooling process. The evaporators are self-regulating by virtue of the freezing mechanism, and maintain themselves at a temperature of approximately 32° F. Because of the good thermal conductivity and large surface area of the evaporator blocks, very efficient heat transfer is achieved.

The described exemplary embodiment is self-regulating, obviating the need for complex automatic controls. A space enclosure cooled in accordance with the principal aspect of the invention does not require the use of a cooling garment or coolant system with its pumps, reservoir, etc., and therefore has a weight advantage important to space applications. The described arrangement is very reliable and safe, and offers a number of auxiliary advantages such as permitting the center of gravity of a cooled enclosure to be lowered.

In another one of its aspects, the invention concerns the use of a porous metal block evaporator for the central heat exchanger employed in space suits having closed-loop coolant circulating systems.

It is an important feature of the invention that an evaporator for use in a vacuum comprise a fluid-fed mass of a material having high porosity and high thermal conductivity. In accordance with another feature, a cooling arrangement includes a network of evaporators distributed over the surface of a space enclosure, the evaporators exchanging heat directly between the enclosure and outer space by an evaporation mechanism.

The novel features which are believed to be characteristic of the invention both as to its organization and method of operation, together with further objects and advantages thereof, will be more particularly understood from the following description considered in connection with the accompanying drawings in which an illustrative system embodying the principles of the invention is illustrated by way of example. It is to be expressly understood, however, that the drawings are for the purpose of illustration and description only and are not intended as a definition of the limits of the invention.

Figure 1:
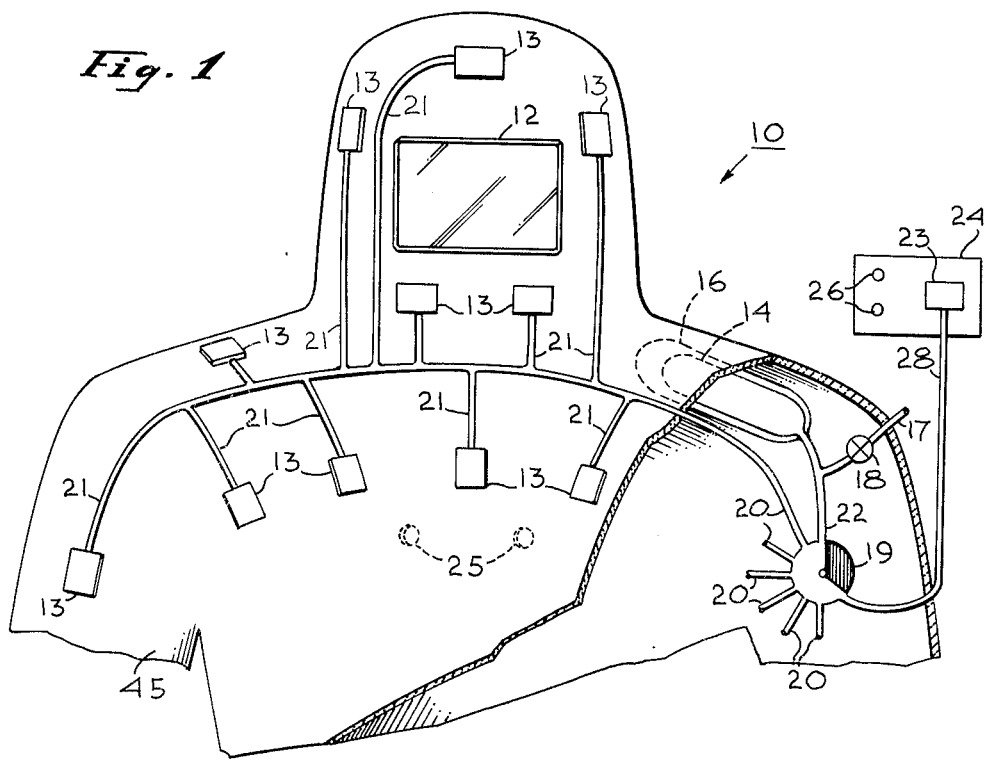
FIG. 1 is a schematic representation of the upper portion of a space suit provided with a network of evaporators in accordance with one aspect of the invention.

The portion of space suit 10 in FIG. 1 shows one way in which a plurality of evaporators 13 may be distributed over a representative segment of the surface of a space enclosure. Space suit 10 includes the head portion with viewing port 12 and is cut away to reveal apparatus inside the left shoulder portion and over the outside surface for supplying an evaporant to evaporators 13. Space suit 10 may be of any known construction having a wall 45 of good thermal conductivity.

The space suit may include, in addition to the elements represented in the drawings, a breathing arrangement having, for example, such well known elements as an odor and debris trap using activated carbon, a carbon dioxide absorber of lithium hydroxide, a blower and power arrangement, and an oxygen supply. In addition there may be a gas cooler and water trap for controlling the atmospheric temperature and humidity within the suit. The apparatus described constitutes a breathing pack which is represented in FIG. 1 by block 24 having ports 26 connectable to corresponding ports 25 on the back surface of space suit 10. This invention is concerned with the breathing pack insofar as the cooling mechanism described is applicable to the gas cooler.

Figure 2:
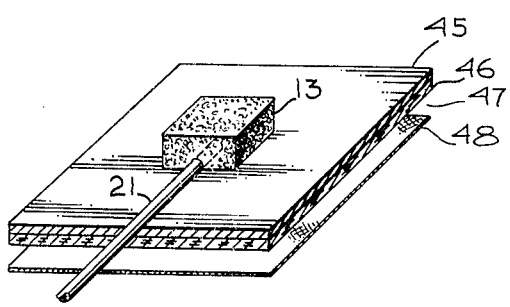
FIG. 2 represents an evaporator block on a segment of the space suit surface.

The structure of a segment of space suit 10 is shown more fully in FIG. 2 where outer wall 45 is seen to be lined over its interior with a layer of sponge material 46. Wall 45 is preferably of aluminum which has the requisite high thermal conducitivity, and sponge material 46 is bonded thereto. Although represented as a simple layer of sheet material, wall 45 may be of honeycomb construction, or may be additionally lined over its exterior with radiation protective layers such as those described in copending U.S. patent application No. 376,745 of Alan S. Penfold entitled, "Self-Contained Thermal and Respiratory Life Support System," filed on June 22, 1964, and assigned to the assignee of the present invention. Sponge layer 46 serves the dual purpose of trapping water condensate and preventing direct contact between the suit inhabitant and wall 45; its effect on heat transfer rates is negligible. Space 47, which may be about one-half inch in depth, permits the circulation of a gaseous atmosphere within suit 10 between layer 46 and outer garmet 48 of the suit inhabitant. Although radiation is the principal mechanism by which heat leaves the suit inhabitant, this is aided by convection and conduction in space 47.

An exemplary evaporator 13 is shown in FIG. 2. Evaporant is fed to evaporator 13 by tube 21 which lies on the surface of wall 45 and passes through the underside and terminates in the center of the evaporator. Tube 21 may be affixed to wall 45 by welding or brazing, for example. Tube 21 is supplied water evaporant from the apparatus revealed in the cut-away section of the space suit shown in FIG. 1. Evaporator 13 may be of any convenient shape and is composed of a material of good thermal conductivity containing a high density of interconnecting voids. Satisfactory material has been found to be foam copper containing continuous filaments having a density and thermal conductivity of about 1/18 that of a corresponding solid. A cubic inch of this copper material contains about 27,000 interconnecting voids per cubic inch and has an estimated surface area of over 100 square inches. It will be obvious that other materials, most notably aluminum but including other substances, can be made to answer the requirements of highly concentrated evaporation area and good thermal conductivity. Porous ceramic coated with a metal would also have adequate conductivity to perform the function desired. Evaporator 23, shown affixed to breathing pack 24 in FIG. 1, is like evaporators 13.

The dimensions of evaporators 13 will depend upon their distribution, the amount of cooling required, and the evaporant rate of flow; exemplary dimensions are given below.

Returning to FIG. 1, the fluid supply apparatus is shown to comprise chamber 16, bladder 14, valves 18 and 19, filling spout 17 and ducts 22, 20 and 28, together with tubes 21. Chamber 16 is conveniently located within suit 10 in a place where it will not impede the inhabitant's movement. In a suit having a multiple wall, chamber 16 might be disposed within the wall. Chamber 16 need not be rigid, but a rigid construction advantageously permits the space yielded by shrinking bladder 14 to be used for the storage of accumulating liquid wastes such as sweat and the respiration condensate removed during gas cooling in breathing pack 24. Chamber 16 is open to the atmospheric pressure of suit 10 so that this pressure is exerted on bladder 14.

Bladder 14 is flexible and contains distilled water evaporant, about 3 liters being required for a 4-hour mission in space. Under pressure from the atmosphere of suit 10, water is forced from bladder 14 along duct 22 to valve 19 and thence along ducts 20 and 28 and tubes 21 to evaporators 13 as well as to evaporator 23. Ducts 22, 20 and 28 and tubes 21 may be of a metal such as copper or aluminum. Spout 17 is connected to duct 22 by valve 18 and permits bladder 14 to be refilled at the end of a mission. As shown in FIG. 1, valve 19 is located within the suit; ducts 20 and 28, tubes 21 and evaporators 13 and 23 are located outside of the suit. This is a preferred arrangement but the invention requires only that the evaporators be exposed to the vacuum of space. Valve 19 is controllable by the suit inhabitant to regulate the number of ducts 20 connected to bladder 14.

Turning now to a consideration of the operation of the cooling system, evaporators 13 and 23 cool by virtue of the evaporation or sublimation of water into space. Water enters an evaporator 13 via the tube 21 associated therewith. As it evaporates, it brings the temperature of the evaporator block down to the freezing point of water, 32° F. At this point the water being supplied to the evaporator freezes as does the water vapor which has condensed within the block pores. The frozen water in the evaporator block then sublimates into outer space, removing, for each gram of water, approximately 600 calories for the heat flowing by conduction from suit wall 45 to the evaporator. As the frozen water is sublimated, more water flows into the evaporator and the process sustains itself. In this way an evaporator 13 or 23 automatically maintains itself at a temperature of 32° F., cycling perhaps 1 to 3 degrees on either side of this figure. By virtue of the positive utilization of water freezing, the invention turns to advantage what was formerly an impediment to the successful operation of water cooling systems, achieving a self-regulating arrangement having no need of complex control apparatus. The good thermal conductivity of the evaporator material permits efficient heat transfer and a controlled water dissipation, thereby avoiding aeration and the formation of "rotten ice" which rendered prior water saturated materials inefficient.

An exemplary distribution of evaporators 13 on the surface 45 of suit 10 is indicated schematically in FIG. 1. Using blocks having dimensions of 1 x 1 x ½ inch, 72 evaporators 13 are more than efficient to cool an ordinary space suit. These evaporators may be distributed in a balanced fashion as follows: 9 over the head portion, 35 on the torso, 18 over the legs, and 10 over the arms of space suit 10. The evaporators 13 receive their evaporant under the control of valve 19. The valve is supplied in order that the inhabitant of suit 10 may exercise some control over the mean temperature of the suit. Since the described arrangement is self-regulating, the provision of valve 19 is a convenient refinement but not necessary in accordance with the basic self-regulating aspect of the invention. The evaporators 13 are shown to be connected to a representative one of ducts 20 controlled by valve 19. The mean temperature of space suit 10 will be controlled adequately if there are six ducts 20, each having twelve evaporators 13 connected thereto. The effect of operating valve 19 to close off one or more of the ducts 20, and thus raise the mean temperature of suit 10, will be to change the distribution of heat sinks at the surface of suit 10. The distribution of evaporators 13 will be peculiar to each particlar application and may be adjusted in accordance with a desired result to be had from operating valve 19. The distributed cooling is particularly conducive to the comfort of the suit inhabitant, and is further advantageous in this respect in that it does not rely significantly on sweating. Duct 28 is designed to be cut off by valve 19 when bladder 14 is being refilled from spout 17.

It will be seen, then, that considering the system as a whole, space suit 10 is cooled upon the dissipation from evaporators 13 and 23 of water supplied under pressure existing within the suit from bladder 14 via a network of ducts 22, 20 and 28 and tubes 21. Input water valving is achieved by permitting the water to freeze in the evaporators. The use of an arrangement such as that described involves no moving parts, and is therefore not susceptible to most comon forms of failure. In addition, it lends itself to refinements such as the incorporation of cooling and breathing apparatus within space suit walls. Because evaporators 13 are distributed over the whole surface of the suit, a center of gravity is possible which is lower than that which could be realized in previous systems having a heat exchanger mounted high up on the front or back of a space suit.

The thermal dynamics of the described arrangement will be considered briefly. The maximum heat load on a space suit cooling arrangement will be about 2000 B.t.u. per hour, of which 1500 B.t.u. per hour arises from the metabolic processes of the space suit inhabitant. Satisfactory heat transfer from the suit inhabitant to the suit wall will take place when the latter is maintained at an average temperature of 39° F. In one space suit configuration having a wall of 40 mil aluminum, 72 distributed heat sinks (evaporators 13) at 32° F. will provide the desired temperature profile. These heat sinks, evaporators 13, may be distributed as indicated above. The total weight of 72 aluminum 1 x 1 x ½ inch evaporators is only about one-seventh of a pound.

Water may not be fed to an evaporator at a rate so great that freezing cannot take place within the evaporator block. For a 1 x 1 x ½ inch copper evaporator having 27,000 voids per cubic inch and receiving water under a suit pressure of 5 p.s.i., the maximum rate of water flow has been found to be approximately 2.15 pounds per hour.

This figure would decrease if either void size or suit pressure were increased. In the exemplary embodiment, the 12 evaporators 13 connected to a duct 20 draw water asynchronously, and 2.15 pounds per hour is therefore the maximum flow rate in each such duct. Because only approximately 2 pounds of water need be evaporated in an hour to remove a heat load of 2000 B.t.u., however, the average flow rate in each duct 20 will be only one-sixth or less of the maximum rate. From these exemplary considerations, the rate of flow in each duct 20 is preferably limited to about one pound of water per hour, thus remaining well within the 2.15 pound maximum while leaving a broad margin of safety to account for suit pressure variations, minor orifice obstructions and the like. The rate of flow may be limited by proper choice of duct size or by valves.

Figure 3:
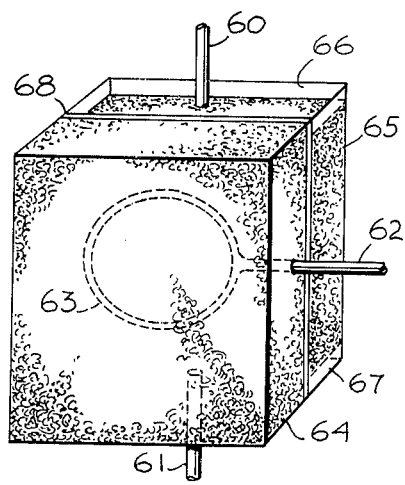
FIG. 3 shows schematically a central heat exchanger to be used with a cooling garment in accordance with another aspect of the invention.

Turning to FIGURE 3, there is shown schematically and in perspective a central heat exchanger which may be used with a coolant garment in accordance with another aspect of the invention. The exchanger comprises evaporator 64, composed of a material such as that employed in evaporators 13 previously referred to and exposed to the vacuum of space. Water is supplied to evaporator 64 by tube 62 which terminates within the bulk of the evaporator material in a ring 63. Ring 63 is tubular and has a plurality of orifices (not shown) whereby the large quantity of water to be evaporated is distributed through the bulk of evaporator 64 in a particularly efficient manner. Alternatively, a plurality of tubes having orifices for distributing water might be embedded in evaporator 64 and fed in parallel from tube 62. Separated from evaporator 64 by thermally conductive wall section 68, which may be the outer wall of a space enclosure, is heat exchanger 65. Heat exchanger 65 is of the same material as evaporator 64 but recessed above and below, as indicated, for the supply and subsequent collection of coolant liquids coming from duct 60 and carried away by duct 61. The apparatus of FIG. 3 is intended to work with the type of cooling arrangement where coolant liquid is circulated through the space enclosure, as through tubes in a coolant garment surrounding a space suit inhabitant, in a closed circuit. The insertion in this circuit of heat exchanger 65 permits the coolant liquid to be cooled by the evaporation of water from evaporator 64. The use of the porous material of high thermal conductivity in evaporator 64 and heat exchanger 65 results in a great increase in efficiency and a saving in weight compared with previous cooling arrangements.

It is to be understood that the above-described arrangements are illustrative of the application of the principles of the invention. Numerous other arrangements may be devised by those skilled in the art without departing from the spirit and scope of the invention. Thus by way of example, but not of limitation, other materials may be used in place of those suggested above, valves may be provided for emergency circumstances or for other reasons, helium may be employed to increase the heat transfer efficiency between the inhabitant and walls of the space suit, and the arrangement may find application in space enclosures other than those primarily designed to house human beings. Accordingly, from the foregoing remarks it is to be understood that the present invention is to be limited only by the spirit and scope of the appended claims.

What is claimed is:

1. Arrangement for cooling a space suit having a pressurized interior comprising:
    thermally conductive means encompassing at least a part of said suit for transferring heat from the interior to the exterior thereof,
    a plurality of thermally conductive porous masses distributed over the surface of said conductive means for dissipating the heat transferred thereby into space,
    a liquid reservoir under the pressure of said space suit, and
    duct means for distributing said liquid to said porous masses.

2. The invention defined in claim 1 wherein said liquid is water and said reservoir is a flexible bladder.

3. The invention defined in claim 1 wherein said porous masses are distributed in groups and said duct means comprises a separate duct for supplying liquid to each group.

4. The invention defined in claim 3 wherein the duct means further comprises valve means operable to selectively control the supply of liquid to said ducts.

5. In a space suit cooling arrangement:
    a layer of thermally conductive material in said space suit,
    porous thermally conductive means distributed over and in good thermal contact with said layer, said conductive means being exposed to space, and
    means for supplying a liquid under pressure to said conductive means.

6. Heat exchanging arrangement for cooling an enclosed region in space comprising:
    enclosure means surrounding said region,
    means for circulating a coolant fluid through said region for removing heat therefrom, means for circulating said coolant through a mass of thermally-conductive material,
    thermally conductive porous means in thermal contact with said mass and exposed to space, and
    means for supplying an evaporable liquid to said porous means under pressure.

7. The invention defined in claim 6 wherein said mass of thermally conductive material is a highly porous metallic block.

8. The invention defined in claim 6 wherein said porous means is a metallic mass having a high density of interconnecting voids.

9. The invention defined in claim 6 characterized in that said liquid is water.

References Cited by the Examiner

UNITED STATES PATENTS

| | | | |
|---|---|---|---|
| 2,544,381 | 3/51 | Goldmerstein | 62—304 |
| 2,908,455 | 10/59 | Hoadley | 62—315 |
| 2,941,759 | 6/60 | Rice | 62—316 |
| 3,041,851 | 7/62 | Stenerson | 62—121 |
| 3,049,896 | 8/62 | Webb | 62—259 |
| 3,086,372 | 4/63 | Barger | 62—239 |
| 3,125,865 | 3/64 | Bemelman | 62—259 |
| 3,138,009 | 6/64 | McCreight | 62—315 |

WILLIAM J. WYE, *Primary Examiner.*